United States Patent [19]
Hayden et al.

[11] 3,897,653
[45] Aug. 5, 1975

[54] STABILIZER SYSTEM FOR A WINDOW PANEL

[75] Inventors: William P. Hayden, St. Clair Shores; Willard J. Hershey, Detroit; Robert W. Huzzard, Livonia, all of Mich.

[73] Assignee: Ford Motor Company, Dearborn, Mich.

[22] Filed: Sept. 13, 1974

[21] Appl. No.: 505,882

[52] U.S. Cl.................................... 49/375; 49/227
[51] Int. Cl.² ...................... B60J 1/17; E05F 11/38
[58] Field of Search ............ 49/375, 374, 376, 377, 49/378, 227, 348, 349, 350, 351, 352, 353

[56] References Cited
UNITED STATES PATENTS

| | | | |
|---|---|---|---|
| 3,413,760 | 12/1968 | Gorys et al. | 49/375 |
| 3,591,982 | 7/1971 | Nantau | 49/227 |

*Primary Examiner*—Philip C. Kannan
*Attorney, Agent, or Firm*—John J. Roethel; Keith L. Zerschling

[57] ABSTRACT

A stabilizer system for a window panel adapted to be lowered into or raised out of a window well in a vehicle body structure by a window regulator mechanism. The window regulator mechanism is coupled to the window panel through channel means affixed to a lower horizontal marginal portion of the window panel. The stabilizer system includes spaced vertical guide rods positioned within the window well beneath the ends of the window panel. A stabilizer assembly is slidable on each guide rod. Each stabilizer assembly has spaced guide means bearing on the respective rod on which it is slidable at two contact points spaced along the rod length.

The improvement comprises each stabilizer assembly including a vertically elongated support bracket carrying a vertically extending glass run channel that receives a vertical edge of the window panel. The vertical guide member on each support bracket has interlocking sliding engagement with the channel means affixed to the window panel.

Upon the window panel being lowered, each stabilizer assembly moves on its respective guide rod with the window panel to a stop position adjacent the bottom of the window well. The window panel is further lowerable in the run channels a predetermined distance after the guide assembly reaches its lowermost position. The window panel during its additional movement is maintained by the guide members in a substantially central position between the run channels.

11 Claims, 3 Drawing Figures

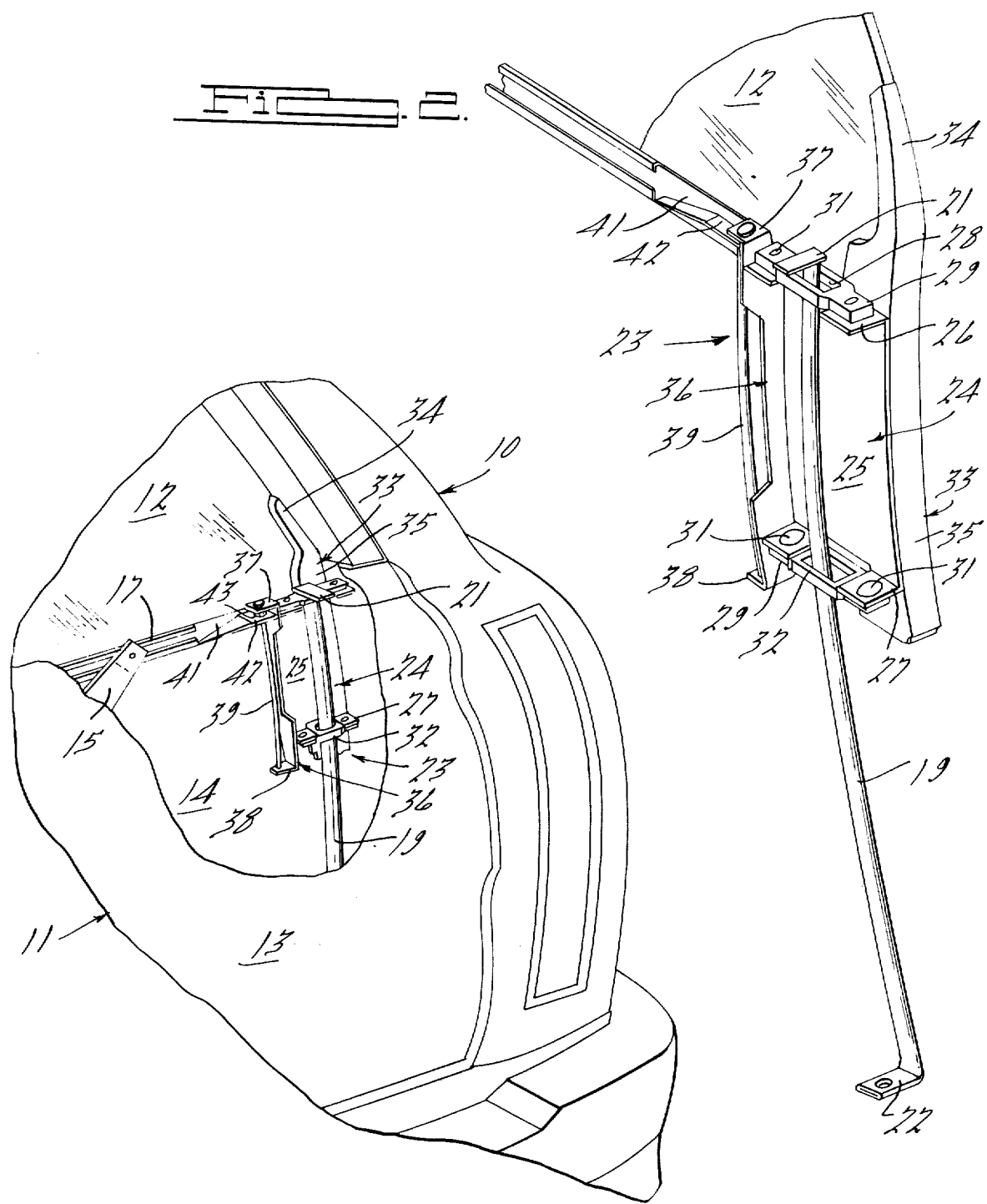

STABILIZER SYSTEM FOR A WINDOW PANEL

BACKGROUND OF THE INVENTION

U.S. Pat. No. 3,413,760 issued Dec. 3, 1968 to J. P. Gorys et al. for "Vehicle Window Control System" discloses a "tube and shoe" vehicle window control system. The control or guide system includes a pair of spaced rods or tubes functioning as guide tracks, and guide members or shoes slidable along the rods to provide the required stabilization. The system is shown in this patent as applied to a vehicle front door. A similar system is currently in use on the tailgate doors of station wagons.

In the patented system, a main guide member extends a substantial vertical distance below the right end of the window panel. This affects the vertical height of the window panel. If it is desired that the upper edge of the window panel lie flush with the upper surface of the door structure when the window panel is fully lowered into the window well, the depth of the well must be equal to the total vertical distance from the bottom of the main guide member to the top horizontal surface of the window panel or its frame, if it is framed. This results in an involuntary limitation on the vertical height of the window panel. This is particularly noticeable in the station wagon tailgate doors in which the tailgate window extends substantially across the window of the vehicle body causing the window to have a disproportionately narrow vertical appearance.

It is an object of the present invention to provide a tube and shoe stabilization system in which the vertical heighth of the main guide member is not added to the vertical height of the window panel in determining the depth required for the window well. The length of the window panel in the vertical direction is substantially increased and the upper edge of the door or body structure is correspondingly lowered. This provides a window which is better proportioned in the ratio of width to height and which has a substantially greater see-through area.

SUMMARY OF THE INVENTION

The present invention relates to a stabilizer system for a window panel adapted to be lowered into or raised out of a window well in a vehicle body structure by a window regulator mechanism. The window regulator mechanism is coupled to the window panel through channel means affixed to a lower horizontal marginal portion of the window panel. The stabilizer system includes spaced vertical guide rods positioned within the window well beneath the ends of the window panel. A stabilizer assembly is slidable on each guide rod. Each stabilizer assembly has spaced guide means bearing on the respective rod on which it is slidable at two-contact points spaced along the rod length.

The improvement comprises each stabilizer assembly including a vertically elongated support bracket carrying a vertically extending glass run channel adapted to receive a vertical edge of the window panel. The vertical guide member on each support bracket has interlocking sliding engagement with the channel means secured to the window panel.

Upon the window panel being lowered, each stabilizer assembly moves on its respective guide rod with the window panel to a stop position adjacent the bottom of the window well. The window panel is further lowerable in the run channels a predetermined distance after the guide assembly reaches its lowermost position. The window panel during additional movement is maintained by the guide members in a substantially central position between the run channels.

BRIEF DESCRIPTION OF THE DRAWINGS

FIG. 1 is a fragmentary perspective view of the rear end of a station wagon illustrating the orientation of the stabilizer system embodying the present invention;

FIG. 2 is an enlarged perspective view of the stabilizer means shown in FIG. 1.

DETAILED DESCRIPTION OF THE INVENTION

Figure 3:
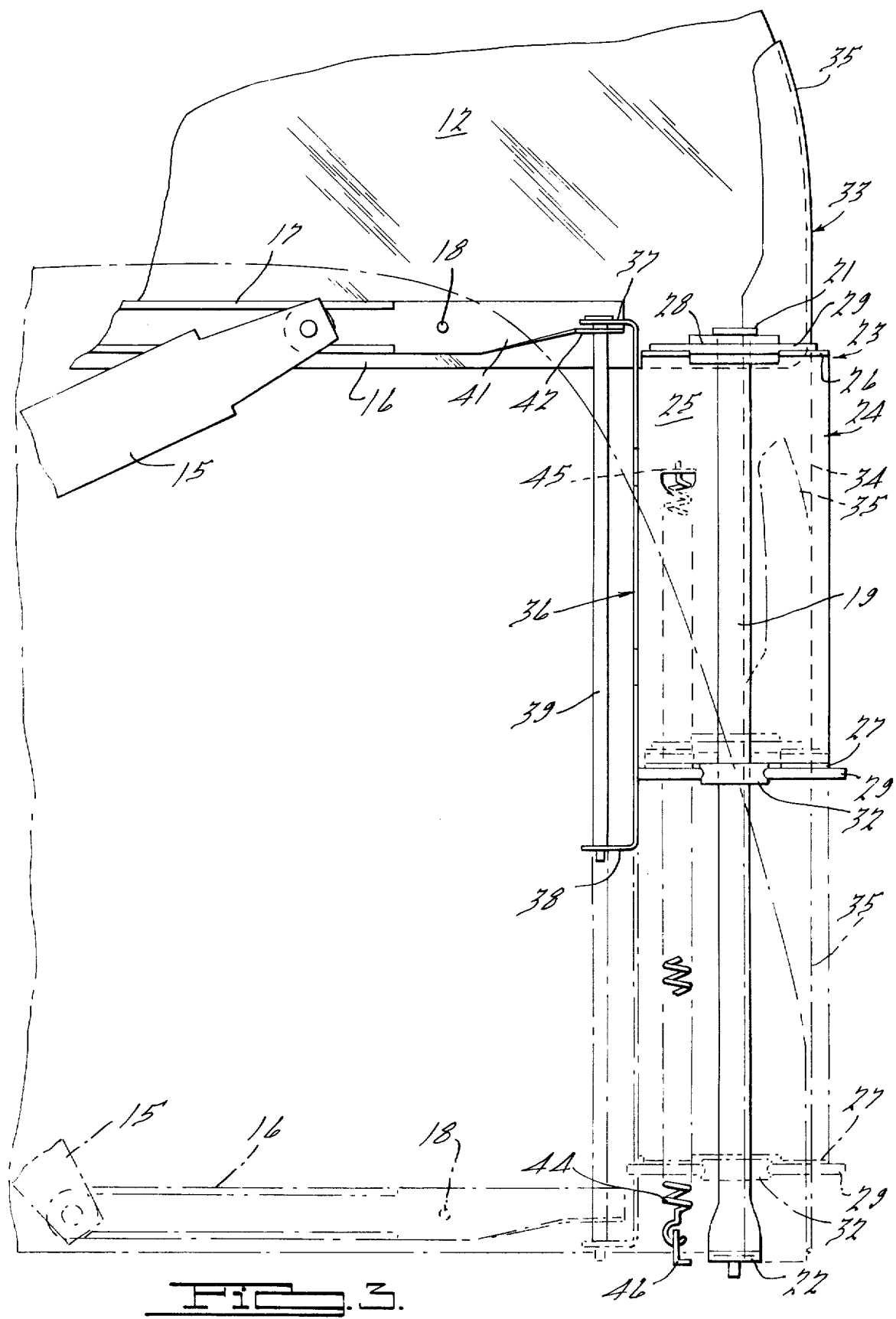
FIG. 3 is a vertical view of the stabilizer means showing the parts in a solid outline raised position and in a dot and dash outline lowered position.

Referring now in detail to the drawings and in particular to FIG. 1, the numeral 10 denotes the rear end of a vehicle body of the station wagon type. The vehicle has a rear door that is hinged for swinging movement about a vertical hinge axis to function as a conventional door or for swinging movement about a horizontal hinge axis to function as a conventional tailgate. The door contains a window panel 12 adapted to be lowered into or raised out of a window well between the door outer panel 13 and the inner panel 14. The window panel 12 is adapted to be lowered or raised by a window regulator mechanism (not shown) positioned substantially beneath the center of the window panel 12. The free end 15 of an arm of the window regulator mechanism is shown coupled to the lower horizontal marginal portion 16 of the window panel through a channel means 17 secured to the window panel adhesively or mechanically as by rivets 18, see FIG. 3.

The window panel is guided and stabilized during its up and down movement on a pair of spaced vertical guide rods 19, there being one located substantially at each end of the door tailgate. The rods 19 are anchored at their upper and lower ends to the vehicle body or door-tailgate structure by flanges 21 and 22, respectively, which may be welded or bolted to the supporting structure.

It will be understood that only one end of the door-tailgate and the mechanism associated therewith is shown.

A stabilizer assembly slidably couples the window panel 12 to each guide rod 19. Prior to the present invention, the stabilizer assembly would be attached directly to the window panel 12 or to the frame of the window panel, as disclosed in U.S. Pat. No. 3,413,760. Each stabilizer has faced guide means or shoes bearing on the respective rod 19 on which it is slidable at two contact points spaced along the rod length. As will be more fully explained, this relationship of the stabilizer assembly to the guide rods 19 is maintained in the present invention although the stabilizer assembly is not directly attached to the window panel 12 or its frame.

The stabilizer assemblies, generally designated 23, embodying the present invention include a substantially C-shaped support bracket 24 constructed of resilient material such as spring steel. Support bracket 24 has a vertical plate portion 25 having slightly diverging arms or flanges 26 and 27 at its upper and lower edges, respectively. The arm or flange 26 carries an elongated bearing 28 of plastic material having a low coefficient of friction. Bearing 28 is held in place by a mounting plate 29 secured to flange 26 by suitable fasteners 31.

The arm or flange 27 carries a bearing 32 similar to the bearing 28.

In the window control system disclosed in U.S. Pat. No. 3,413,760, the window panel is rigidly connected to the equivalent of the support bracket 24 at its bearings 28 and 32. The disclosed system allows two degree freedom of movement of the panel while preventing lateral movement. That is, the panel may move vertically along the guide rods and it may move horizontally in the plane of the panel, but it is restrained against movement laterally of the plane of the panel. In the present invention, a further degree of movement is permitted. That is, the panel 12 is movable relative to the support bracket 24 under controlled circumstances.

Secured to the rear face, the one closest to the inner panel 14 of the door-tailgate 11, of each support bracket 24 is a window channel 33 which has a U-shaped body portion 34 about half the horizontal width of the support bracket 24 and which extends upwardly above the bracket. The channel 33 has an inwardly curved U-shaped appendage 34 complementary to the contour of the side edges of the window panel 12. The channel 23 is flock-lined in a conventional manner to cushion and insulate the window panel 12 against direct contact with abutting channel surfaces.

Also, each stabilizer support bracket 24 has at its inboard edge a secondary bracket 36 having upper and lower vertically spaced flanges 37 and 38 which rigidly support a guide member or rod 39. Each guide member or rod 39 parallels the adjacent guide rod 19 and in particular has the same degree of lateral curvature as the companion guide rod 19.

The channel means 17 supported on the lower edge 16 of the window panel 12 has at one end an extension 41 having a lateral flange 42. The lateral flange 42 has an aperture 43 through which the guide rod 39 projects. It will be understood this structure is duplicated at the other end of the channel means, which is not shown.

As best seen in FIG. 3, a tension spring 44 extends vertically from an attachment point 45 on the rear face of support bracket 24 to an attachment point 46 at the base of the door-tailgate.

In FIGS. 1 and 2, the window panel 12 and stabilizer assembly 23 are shown in the window panel raised position. Upon the window regulator mechanism, as represented by the fragmentary portion of the regulator arm 15, being operated in window panel lowering direction, the panel 12 will release its upward pressure on the appendages 34 on the body portion 35 of the channel 33 carried on the support bracket 24. (This occurs simultaneously at both side ends of the window panel 12.) In response to operation of the window regulator, the window panel 12 and its stabilizer assemblies 23 begin to move downwardly on the guide rods 19. The tension spring 44 makes certain that the support brackets 24 will move down the respective rod 19 against any frictional resistance that might be encountered, since at this stage of the movement there is no driving engagement between the window panel which is being driven downwardly by the regulator mechanism and the support bracket.

Downward movement of the window panel 12 and the support brackets 24 continues until the support brackets are stopped by abutment with the bottom of the window well. In a conventional window panel installation in which the support bracket is a vertical extension of the window panel frame, see for example U.S. Pat. No. 3,413,760, the downward movement of the panel 12 would be halted at this point.

In the present installation, the panel 12 is able to continue its downward movement under control of the guide members or rods 39. The primary purpose of these rods is to maintain the window panel edges substantially centrally within the run channels 33 after the panel edges become disengaged from the appendages 34 on the channels. Downward movement of the panel 12 continues until the lower end of each rod 39 is abutted by the lateral flanges 42 on the channels 17 at each side end of the window panel 12.

Upon the regulator mechanism being operated to raise the glass panel 12, the panel first will be raised relative to the stabilizer assemblies, being guided by the guide rods 39. The movement of the panel 12 is relative to the support bracket of each stabilizer assembly 23 until the panel edges engage the appendages 35 on the body portion 34 of the channels 33. When this occurs, the support brackets 24 are carried upwardly on the respective guide rods 19. This movement along the rods 19 maintains the lateral stability of the panel 12 as it is raised within the window opening.

The present invention thus provides a vehicle window control system in which the depth of the window well does not have to accommodate the cumulative height of the window and the stabilizer system, as was the case with the structure disclosed in U.S. Pat. No. 3,413,760. The vertical depth of the window well may be decreased permitting a lower belt line at the rear of the vehicle body. The vertical height of the window opening may be proportionately increased permitting utilization of a vertically longer window panel. This provides greater window area which is usually considered a desirable vehicle feature.

It is to be understood that this invention is not limited to the exact construction illustrated and described above, but that various changes and modifications may be made without departing from the spirit and scope of the invention as defined by the following claims.

We claim:

1. A stabilizer system for a window panel adapted to be lowered into or raised out of a window well in a vehicle body structure by a window regulator mechanism, the window regulator mechanism being coupled to the window panel through channel means affixed to a lower horizontal marginal portion of the window panel, the stabilizer system including spaced vertical guide rods positioned within the window well beneath the ends of the window panel, and a stabilizer assembly slidable on each guide rod, each stabilizer assembly having spaced guide means bearing on the respective rod on which it is slidable to contact points spaced along the rod length, wherein the improvement comprises:

each stabilizer assembly including a vertically elongated support bracket carrying a vertically extending glass run channel receiving a vertical edge of the window panel, and a vertical guide member on each support bracket having interlocking sliding engagement with the channel means, upon the window panel being lowered each stabilizer assembly moving on its respective guide rod with the window panel to a stop position adjacent the bottom of the window well, the window panel being further lowerable on the run channels a predetermined distance and maintained during such movement substantially centrally within the run channels by the guide members.

2. A stabilizer assembly according to claim 1, in which:

the predetermined distance the window panel may be lowered beyond its stopped position is substantially equal to the length of the support bracket.

3. A stabilizer system according to claim 2, in which:

the channel means are provided with apertured integral extensions interlocked with the guide members.

4. The stabilizer system according to claim 3, in which:

a spring means extending between the support bracket and the vehicle body structure biases the support bracket in a downward direction.

5. A stabilizer system according to claim 4, in which:

the run channels project above the upper ends of the guide rods in fully raised position of the window panel.

6. A stabilizer system according to claim 1, in which:

a spring means extending between the support bracket and the vehicle body structure biases the support bracket in a downward direction.

7. A stabilizer system according to claim 6, in which:

the run channels project above the upper ends of the guide rods in fully raised position of the window panel.

8. The stabilizer assembly according to claim 7, in which:

the predetermined distance the window panel may be lowered beyond the stop position of the support bracket is substantially equal to the length of the support bracket.

9. A stabilizer system according to claim 1, in which:

the run channels project above the upper ends of the guide rods in fully raised position of the window panel.

10. A stabilizer system according to claim 9, in which:

the channel means has apertured integral extensions interlocked with the guide members for sliding movement therealong.

11. A stabilizer assembly according to claim 10, in which:

the predetermined distance the window panel may be lowered beyond its stopped position is substantially equal to the length of the support bracket.

* * * * *